Feb. 16, 1965  J. N. ROPER, JR  3,169,390
LIQUID PHASE FOR GAS-LIQUID CHROMATOGRAPHIC COLUMN PACKING
Filed Aug. 27, 1962
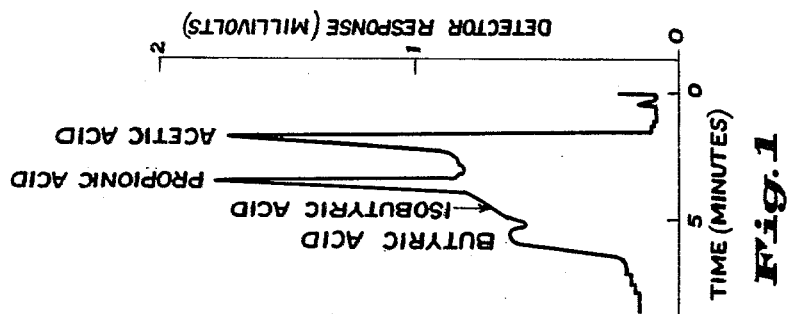
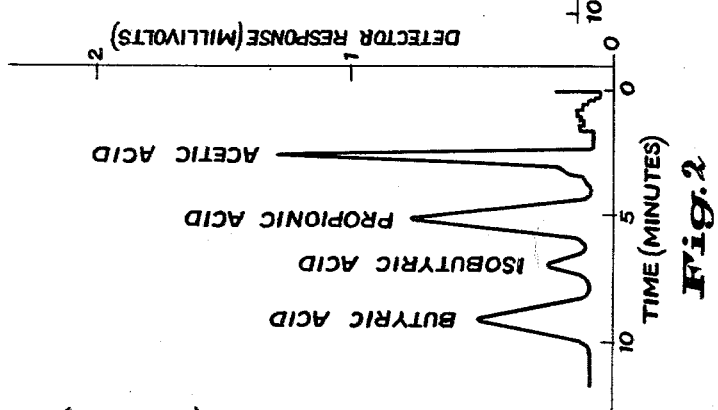
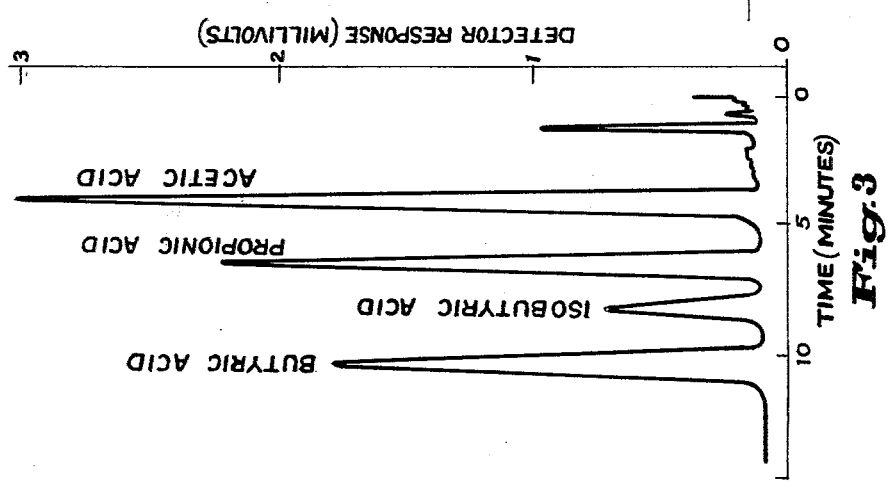
INVENTOR
JOHN N. ROPER, JR.
BY R. Frank Smith
William T. French
ATTORNEYS 3,169,390
LIQUID PHASE FOR GAS-LIQUID CHROMATOGRAPHIC COLUMN PACKING
John N. Roper, Jr., Kingsport, Tenn., assignor to Eastman Kodak Company, Rochester, N.Y., a corporation of New Jersey
Filed Aug. 27, 1962, Ser. No. 219,644
5 Claims. (Cl. 73—23.1)

This invention relates to the analysis of mixtures containing organic acids by a gas-liquid chromatographic procedure. More specifically this invention relates to the use of an improved liquid phase for the packing of a gas-liquid chromatographic column in the separation of organic acids.

The analysis of mixtures of organic acids has long been a troublesome problem for analytical chemists. The advent of gas-liquid chromatography improved the analysis enormously but did not supply an entirely problem-free method. For example, when packing materials known prior to the present invention are used in chromatographic columns, peaks due to acid components in the mixture being analyzed may sometimes be poorly shaped, having long sloping tails which may interfere with other chromatogram peaks. Therefore the provision of a liquid phase of the column packing which substantially prevents such poorly-shaped curves in the analysis of mixtures of organic acids represents a highly desirable result.

One object of the present invention is to provide an absorbent for use in gas chromatographic partition columns which permits sharp peaks and good resolution in analyzing mixtures of organic acids. Another object is to provide an absorbent for a gas chromatographic column which is sufficiently high boiling to not be eluted from the column. A further object is to provide a gas-chromatographic liquid phase specially adapted for analyzing samples containing organic acids, said liquid phase permitting the coupling of lowered volatility with improved resolution of components and more precise definition of individual chromatogram peaks. These and other objects of the invention will be apparent hereinafter.

In its broader aspects my invention involves the use of homopolymers of certain vinyl monomeric acids and copolymers of certain vinyl monomeric acids with specific vinyl monomers with which they are copolymerizable as novel ingredients of the liquid phase of a gas-liquid chromatographic partitioning column. I have found that homopolymers of vinyl mono and dicarboxylic acids having the formula

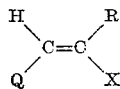

wherein Q is a hydrogen atom or a carboxyl group, R is a hydrogen atom, methyl or carboxyl group, and X a carboxyl or methylenecarboxyl group, as illustrated by acrylic, methacrylic, itaconic and citraconic acids and copolymers of vinyl mono and dicarboxylic acids having the formula

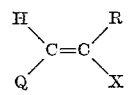

wherein Q represents a hydrogen atom or carboxyl group, R a hydrogen atom, methyl or carboxyl group, and X a hydrogen atom, carboxyl or methylenecarboxyl group as illustrated by acrylic, methacrylic, itaconic, citraconic, maleic and fumaric acids with vinyl monomers copolymerizable therewith having the structural formula

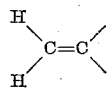

for example, esters of acrylic and methacrylic acid such as methylacrylate, ethylmethacrylate and the like, vinyl esters such as vinyl acetate, vinyl isobutyrate and the like, unsaturated hydrocarbons such as styrene, propylene, isobutylene and the like, and related compounds are surprisingly effective as such liquid phase ingredients. The polymer and copolymer absorbents of this invention have a molecular weight of at least about 10,000 as determined by ebulliometry.

It is critical that these polymer and coplymer absorbents have at least some free carboxyl groups exposed in such a way that the acid components of the samples being chromatographed may be influenced by them so as to result in a clearcut chromatographic separation. I have found also that the effect of the carboxyl side group in the polymer or copolymer may be enhanced to a certain extent by the use of plasticizer-type liquids, for example bis(2-methyl-2-norcamphanylmethyl)sebacate having the formula

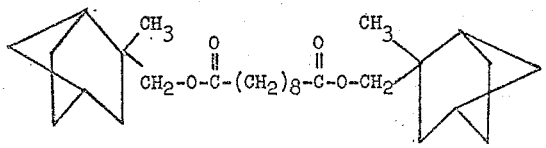

sucrose acetate isobutyrate, silicone fluid, liquid polyester plasticizers, and the like in conjunction therewith. Also, it appears that the low volatility of the liquid phase ingredients of this invention may be related to the lengthening of the useful life of the column. The use of such plasticizer-type liquids either causes the polymer by dissolving to become part of a homogeneous liquid or to mix with the polymer sufficiently to cause a lowering of the melting point. In either case considerable improvement in the definitiveness of the chromatogram peaks and a diminishing of visible trailing tends to result.

The polymer and copolymer absorbents of this invention are solids at room temperature but softenable by raising the temperature sufficiently to cause them to gradually become more or less liquid, especially when the abovementioned plasticizer-type liquids are used in contact therewith. Thus, by the term "liquid phase" as used herein I have reference to the absorbent of the chromatographic column whether the polymer or copolymer be an ingredient of the packing, on the support, or in a separate liquid layer or whether it be liquid or solid at the temperature at which the gas-liquid chromatographic analysis of mixtures of organic acids is performed. For instance, polyacrylic acid may not actually melt or become a liquid during the organic acid chromatographic analysis.

In addition to forming novel liquid phase-support compositions, these ingredients may also be used in capillary-type columns in which the walls are coated with the partitioning liquid.

Either copolymer constituent may make up a minor amount, as little as about 1 percent by weight, of the specified copolymers according to my invention.

For a further understanding of the present invention reference is made to the attached drawing which forms a part of this specification.

FIG. 1 is a chromatogram resulting from the analysis of a mixture of acids using a silicone oil without the polymer ingredients of this invention.

FIG. 2 is a chromatogram resulting from the analysis of a mixture of acids using the same silicone oil and an ethyl acrylate-acrylic acid copolymer as the polymer ingredients.

FIG. 3 is a chromatogram resulting from the analysis of the mixture of organic acids using as absorbent an ethyl acrylate-acrylic acid copolymer with a plasticizer-type liquid according to the present invention.

A further understanding of my invention will be had from a consideration of the following examples which are set forth for illustrating certain preferred embodiments. The polymeric components of the absorbents used in these examples in each case had a molecular weight of greater than 10,000.

Example I

About 1 g. of polyacrylic acid dissolved in a volatile organic solvent was added to 50 cc. of 60 to 80 mesh diatomaceous earth which had already been treated so as to contain 20 percent by weight of a highly branched chain aliphatic, high molecular weight hydrocarbon oil. The volatile solvent was removed by infrared heat and gentle agitation, and the resulting packing was used to pack a 6-ft.-long column made of 5 mm. I.D. glass tubing. The column was used to analyze a mixture of fatty acids ($C_9$ to $C_{18}$) by gas-liquid chromatography and gave a chromatogram with good resolution and well-shaped peaks. When the column temperature was lowered to analyze $C_1$ to $C_6$ acids, the resulting chromatogram did not contain as well resolved peaks.

Example II

Fifty cc. of 60 to 80 mesh diatomaceous earth was treated with 10.3 g. of an acetone solution of a copolymer containing 70 percent by wt. ethyl acrylate and 30 percent by wt. acrylic acid in the amount of 29 percent total solids, to which more acetone was added to make a total volume of 38 cc. to just wet the diatomaceous earth. The acetone was removed by infrared heat and gentle agitation, and the resulting packing was used to pack a 6-ft.-long column made of 5 mm. I.D. glass tubing. The column was used to analyze a mixture of acetic, propionic, isobutyric, and butyric acids by gas-liquid chromatography at a column temperature of 130° C. and a carrier gas rate of 50 ml. per min. The chromatogram showed well shaped peaks and complete separation except that the peaks were less defined for propionic and isobutyric acids. The analysis was complete in 28 min.

Example III

Fifty cc. of 60 to 80 mesh diatomaceous earth were treated with 2 g. of bis(2-methyl-2-norcamphanyl methyl)sebacate, plus 3.45 g. of an acetone solution of copolymer of 70 percent by wt. ethyl acrylate and 30 percent by wt. of acrylic acid, the solution being 29 percent by wt. solids, plus more acetone to make up the solution volume to 38 cc. The acetone was removed from the treated diatomaceous earth with infrared heat and gentle agitation. The resulting packing was used to pack a 6-ft.-long column made of 5 mm. I.D. glass tubing. The column was used to analyze a mixture of acetic, propionic, isobutyric, and butyric acids by gas-liquid chromatography using a 5 μl. sample, a column temperature of 121° C., and a carrier gas rate of 83 ml. per min. The chromatogram was complete in 11 min. and showed well shaped peaks with complete separation of all four acids (FIG. 3). A recording potentiometer with a 5 mv. full-scale sensitivity was used. A similar chromatogram was obtained when methacrylic acid was used as in this example as a copolymer ingredient in place of acrylic acid.

Example IV

A glass chromatographic column such as that of Examples I–III was packed with 35 to 60 mesh diatomaceous earth which had been previously treated with 20 percent by wt. of silicone oil and 5 percent by wt. of a copolymer of ethyl acrylate (7 parts) and acrylic acid (3 parts). A mixture of acetic acid, propionic acid, isobutyric acid, and butyric acid was chromatographed using the above 6-ft.-column at 100° C. with a hydrogen carrier gas rate of 60 ml. per min. to give excellent chromatographic separation results (13 min., FIG. 2) when compared with the relatively poor-peaked chromatograph obtained when a column packed with 20 percent silicone oil alone was used (9 min., FIG. 1).

Example V

Following the procedure of Example I, a column packed with diatomaceous earth containing 20 percent by wt. of a copolymer of itaconic acid (3 parts) and butyl acrylate (7 parts) gave a satisfactory chromatographic separation of a mixture of isobutyric, butyric, valeric, and hexanoic acids at 150° C.

Example VI

Using the procedure of Example I, a column packed with diatomaceous earth containing 15 percent by wt. dioctyl phthalate and 5 percent by wt. of a copolymer of fumaric acid (1 part) and ethyl methacrylate (1 part) gave a satisfactory chromatographic separation of a mixture of acetic, propionic, isobutyric and butyric acids at 120° C.

Example VII

In a similar manner to that of Example I, a column packed with diatomaceous earth containing 15 percent by wt. didecyl phthalate and 5 percent by wt. of a copolymer of citraconic acid (4 parts) and vinyl acetate (6 parts) gave a satisfactory chromatographic separation of a mixture of acetic, propionic, isobutyric, and butyric acids at 120° C.

Example VIII

With the procedure of Example I, a column packed with diatomaceous earth containing 15 percent by wt. trixylyl phosphate and 5 percent by wt. of a copolymer of maleic acid (3 parts) and styrene (7 parts) gave a satisfactory chromatographic separation of a mixture of acetic, propionic, isobutyric and butyric acids at 120° C.

Example IX

In a similar manner to that of Example I, a column packed with diatomaceous earth which had been treated with 1 percent by wt. of polymethacrylic acid and 20 percent by wt. of a highly branched chain aliphatic, high molecular weight hydrocarbon oil was used to analyze a mixture of fatty acids ($C_9$ to $C_{18}$). A satisfactory separation was obtained.

Example X

Using the procedure of Example I, a column packed with diatomaceous earth which had been treated with 1 percent by wt. of polycitraconic acid and 20 percent by wt. of silicone gum rubber was used to analyze a mixture of fatty acids ($C_9$ to $C_{18}$). A satisfactory chromatogram was obtained.

Example XI

Using the procedure of Example I, a column packed with diatomaceous earth treated with 1 percent by wt.

polyitaconic acid and 20 percent by wt. of a high molecular weight hydrocarbon grease was used to analyze a mixture of fatty acids ($C_9$ to $C_{18}$). A satisfactory chromatogram was obtained.

From the above it will be apparent that I have provided a novel vinyl polymer and copolymer-containing liquid phase or absorbent composition which results in pronounced peaks and enhanced resolution for the individual components of an organic acid mixture in gas-liquid chromatographic analysis.

Although the invention has been described in considerable detail with particular reference to certain preferred embodiments thereof, variations and modifications can be effected within the spirit and scope of the invention as described hereinabove, and as defined in the appended claims.

I claim:
1. A method of separating and identifying organic acid components of an organic acid-containing mixture which comprises introducing said mixture into a stream of carrier gas, flowing the combined stream and mixture into contact with a film of absorbent supported on an inert column packing, said absorbent comprising a compound selected from the group consisting of (1) homopolymers of vinyl mono- and dicarboxylic acids having the formula

wherein Q is selected from the group consisting of a hydrogen atom and a carboxyl group, R is selected from the group consisting of a hydrogen atom, a methyl group and a carboxyl group and X is selected from the group consisting of a carboxyl and a methylenecarboxyl group and (2) copolymers of vinyl mono- and dicarboxylic acids having the formula

wherein Q is selected from the group consisting of a hydrogen atom and a carboxyl group, R is selected from the group consisting of a hydrogen atom, a methyl group and a carboxyl group, and X is selected from the group consisting of a hydrogen atom, a carboxyl group, and a methylenecarboxyl group with vinyl monomers copolymerizable therewith having the structural formula

said absorbent having a molecular weight of at least about 10,000, whereby the undivided organic acid components of said mixture are retained by the film in different zones thereof, expelling said individual organic acid components from the film, and discharging said individual organic acid components successively with said carrier gas into a measuring zone wherein the successive peaks are recorded on a chromatogram with substantially no trailing.

2. The method according to claim 1 wherein the absorbent contains a compatible plasticizer-type liquid as a diluent.

3. A liquid phase gas chromatographic column article for producing sharp chromatogram peaks in analysis of mixtures containing organic acids which comprises:
  (1) a porous solid support, and, coated thereon
  (2) an absorbent having a molecular weight of at least about 10,000 selected from the group consisting of:
    (a) homopolymers of acrylic, methacrylic, itaconic, citraconic acids and
    (b) copolymers of acrylic, methacrylic, itaconic, citraconic, maleic and fumaric acids with other vinyl monomers copolymerizable therewith containing the structural unit

4. The article according to claim 3 wherein the absorbent contains a compatible plasticizer-type liquid as a diluent.

5. The article according to claim 3 comprising in addition a silicone oil.

References Cited in the file of this patent
UNITED STATES PATENTS
2,875,606    Robinson _____ Mar. 3, 1959

OTHER REFERENCES
Hornstein, et al.: Gas Chromatographic Separation of Long Chain Fatty Acid Methyl Esters. In Nature 184 (4700), pp. 1710–1711, Q1N2.